P. S. GRIERSON.
ELECTRIC SWITCH CASING.
APPLICATION FILED SEPT. 14, 1920.
1,429,133.
Patented Sept. 12, 1922.
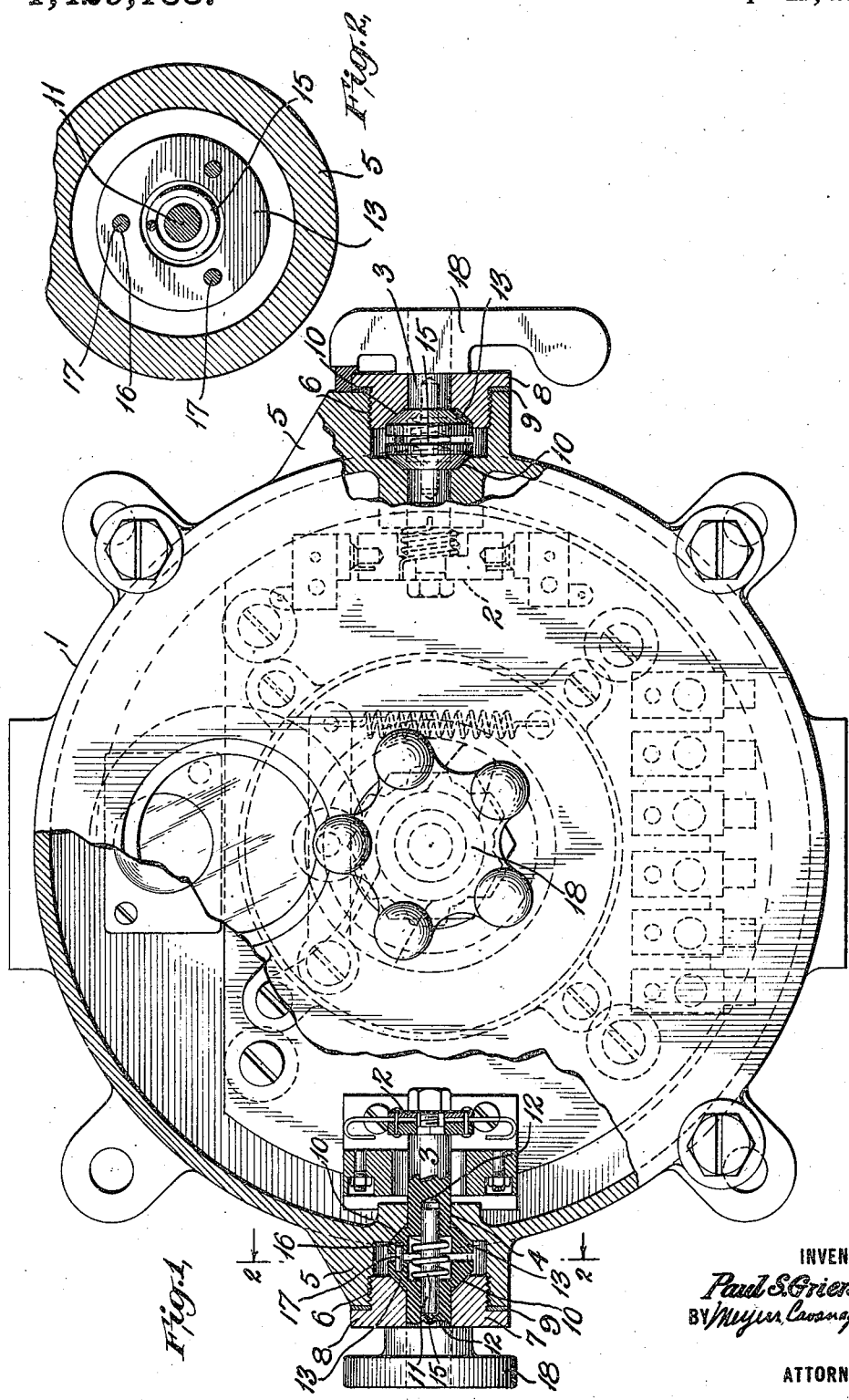
INVENTOR
Paul S. Grierson
BY Meyers, Cavanagh & Hyle
ATTORNEYS Patented Sept. 12, 1922.

1,429,133

UNITED STATES PATENT OFFICE.

PAUL S. GRIERSON, OF SOUTH ORANGE, NEW JERSEY, ASSIGNOR TO CHARLES CORY & SON, INCORPORATED, OF NEW YORK, N. Y., A CORPORATION OF NEW YORK.

ELECTRIC-SWITCH CASING.

Application filed September 14, 1920. Serial No. 410,260.

*To all whom it may concern:*

Be it known that I, PAUL S. GRIERSON, a citizen of the United States, and resident of South Orange, in the county of Essex and State of New Jersey, have invented certain new and useful Improvements in Electric-Switch Casings, of which the following is a specification.

This invention relates to a device for the protection of electric signal transmitting mechanism of the type enclosed in a casing and is especially adapted for use on marine vessels and in places where contact members are likely to become corroded through atmospheric moisture. This type of mechanism is usually enclosed within a casing and is operated by means of a spindle which extends through suitable bearings in the casing. Prior structures have not been entirely satisfactory because the passage of the spindle through the bearings left space whereby atmosphere and atmospheric moisture could reach the parts within the casing. From this presence of moisture within the casing the contact members would become corroded and their operation rendered unreliable. This difficulty is overcome in the present device by the particular construction of the contact operating spindle and the bearing through which the spindle passes in the casing. In the particular structure here shown the passing of the air between the bearing and the spindle is prevented by a peculiar structural relation between the spindle and the bearing. The mechanism provided will not only prevent the passage of atmosphere from the outside to the inside of the casing, but will prevent the outward passage of atmosphere or any other gaseous matter from within.

Another advantage of this device is that it will operate not only under normal atmospheric conditions, but will operate as well in a vacuum or under extreme pressure as under normal atmospheric conditions. A difference in the atmospheric pressure on the inside and the outside of the casing does not affect the effective operation of the parts, owing to the double valve structure of the spindle and bearing.

Another advantage of this device is that the two-part structure of the bearing provides a cavity which can be filled with an oil or some kind of lubricant that will aid in forming an air-tight closure between the spindle and the bearing. In this way a perfectly air-tight closure is formed.

Still another advantage of this device is that it is not affected by the position in which it may be placed. The parts may be in a vertical, horizontal, or in any other position, and still operate perfectly.

Other objects and advantages of the invention will be apparent from the following description, taken in connection with the drawings, in which:

Fig. 1 is a plan view of a switch casing, partly in section, showing the valve mechanism in use; and Fig. 2 is a section on line 2—2 of Fig. 1.

In the accompanying drawing, 1 is the casing. In this casing may be located one or more electrical switches, 2, for operating the signal transmitting mechanism. Each switch is operated by means of a spindle 3, which extends through bearings in the walls of the casing. The bearings for the spindle consist of two parts, one fixed and the other removable. One of these parts, which is designated by the numeral 4, is formed by the casing itself. Around the part 4 of the bearing there is formed integral with the casing a cylindrical projection 5. The outer end of this projection is internally screw-threaded, as at 6, to receive a screw-threaded part of the plug member 7, which forms the removable bearing. The plug member 7 has formed adjacent the threaded part a shoulder 8, which extends over the outer end of the cylindrical projection 5. Between the shoulder 8 and the projection 5, is a packing 9 of some suitable material to form an air-tight connection between the parts. Through the plug 7 is a circular opening in alinement with the bearing in the casing, and forming with said bearing in the casing, a complete spindle bearing. The plug 7, the projection 5, and the adjacent part of the casing, form a cavity. In this cavity and around the bearing are formed two funnel-shaped valve seats 10. The spindle 3 is in two parts, one of which is in the casing part of the bearing and the other is in the plug part of the bearing. The two parts of the spindle are in axial alinement and are so held by means of a large pin 11, which loosely fits in holes 12 in the spindle parts. On each of the adjacent ends of the spindle parts is formed a circular cone-shaped enlargement 13, forming a valve adapted to seat in the beforementioned valve seat. Around the pin 11 and having its ends seated in a suitable recess in the adjacent ends of the spindle part, is a coil spring 15, which tends to push the spindle parts away from each other and hold each valve in its seat. On the adjacent faces of the circular enlargements are alined holes 16. These holes are in lines parallel with the axis of the spindle and receive pins 17 therein whereby the spindle parts are made to rotate in unison. On the outer end of the spindle is an operative handle 18. This handle may be in the shape of a hand wheel or may have any other suitable form.

From the foregoing description, in connection with the drawing, it will be seen that the present device is a simple, efficient and effective means being provided for preventing the passage of moisture into a casing around a spindle passing through the casing. It is also obvious that the device is effective to prevent the passage of moisture either into or out of the casing. And being double acting in its operation it will operate as well under abnormal atmospheric conditions, as under normal. A relative difference between the pressure on the inside and that on the outside will not affect the effective operation of the parts.

While I have described the preferred embodiment of my invention I wish it to be understood that my invention may have any form within the scope of the appended claims.

What I claim is:—

1. In a circuit making and breaking device, a casing enclosing a switch or transmitter, means exterior to the casing for operating the switch or transmitter, provisions connecting said means with the transmitter, said provisions including opposed valve members, the casing providing a bearing for the said provisions; the said bearing including opposed valve seats cooperating with the said opposed valve members whereby a double acting air and watertight bearing is effected for protecting the said enclosed switch or transmitter.

2. In a circuit making and breaking device, a casing enclosing a switch or transmitter, means exterior to the casing for operating the switch or transmitter, provisions connecting said means with the transmitter, said provisions including relatively movable opposed valve members, the casing providing a bearing for the said provisions; the said bearing including opposed valve seats cooperating with the said opposed valve members whereby a double acting air and watertight bearing is effected for protecting the said enclosed switch or transmitter.

3. In a circuit making and breaking device, a casing enclosing a switch or transmitter, means exterior to the casing for operating the switch or transmitter, provisions connecting said means with the transmitter, said provisions including opposed valve members, the casing providing a bearing for the said provisions; the said bearing including opposed valve seats cooperating with the said opposed valve members and means for resiliently urging the valve members into cooperative contact with the valve seats whereby a double acting air and watertight bearing is effected for protecting the said enclosed switch or transmitter.

4. In a circuit making and breaking device, a casing enclosing a switch or transmitter, means exterior to the casing for operating the switch or transmitter, provisions connecting the said means with the transmitter; the said provisions being provided with a valve mechanism, the casing providing a bearing for the said provisions, the said bearing including a valve seat for the said valve mechanism and resilient means for seating the valve mechanism on the valve seat.

5. In a circuit making and breaking device, a casing enclosing a switch or transmitter, means exterior to the casing for operating the switch or transmitter, provisions connecting said means with the transmitter, said provisions including relatively axially movable opposed valve members, the casing providing a bearing for the said provisions; the said bearing including opposed valve seats cooperating with the said opposed valve members and unitary means for resiliently urging the valve members axially in opposed directions into cooperative contact with the valve seats whereby a double acting air and watertight bearing is effected for protecting the said enclosed switch or transmitter.

6. In a circuit making and breaking device, a casing enclosing a switch or transmitter, means exterior to the casing for operating the switch or transmitter, provisions connecting the said means with the transmitter, the said provisions being provided with a valve mechanism, the casing providing opposed bearings for the provisions; the said opposed bearing defining a cavity therebetween, one wall of the cavity presenting a valve seat for the valve mechanism; the said cavity being adapted for holding a lubricant.

7. In a circuit making and breaking device, a casing enclosing a switch or transmitter, means exterior to the casing for operating the switch or transmitter, provisions connecting the said means with the transmitter, the said provisions being provided with a valve mechanism, the casing providing opposed bearings for the provisions; the said opposed bearings defining a cavity therebetween, one wall of the cavity presenting a valve seat for the valve mechanism;

the said cavity being adapted for holding a lubricant and means in the said cavity for resiliently seating the valve mechanism on the valve seat.

8. In a circuit making and breaking device, a casing enclosing a switch or transmitter, means exterior to the casing for operating the switch or transmitter, provisions connecting said means with the transmitter, said provisions including opposed valve members, the casing providing opposed bearings for the said provisions; the said bearings defining a cavity therebetween, opposed walls of the cavity presenting valve seats for the valve members, the said cavity being adapted for holding a lubricant.

9. In a circuit making and breaking device, a casing enclosing a switch or transmitter, means exterior to the casing for operating the switch or transmitter, provisions connecting said means with the transmitter, said provisions including opposed valve members, the casing providing opposed bearings for the said provisions; the said bearings defining a cavity therebetween, opposed walls of the cavity presenting valve seats for the valve members, the said cavity being adapted for holding a lubricant and means in the said cavity for resiliently seating the valve members on the valve seats.

10. In a signal transmitting mechanism, a casing, a bearing in the casing, said bearing being in two parts, one part integral with the casing, the other part removably attached thereto, a valve seat in each part of the bearing, a two part spindle mounted in said bearing, the parts of the spindle being in axial alinement and spaced apart, enlargements on the adjacent ends of the spindle parts, said enlargements forming valves engaging the valve seats, and a means to force the valves into engagement with the valve seat to form an air-tight closure between the spindle and the bearing.

11. In a signal transmitting mechanism, a casing, a bearing in the casing, said bearing being in two parts, and forming a cavity, valve seats in the bearing and forming part of the cavity, a two part spindle rotatably mounted in the bearing, the parts of the spindle being in axial alinement and spaced apart, enlargements on the adjacent ends of the spindle parts, said enlargements forming valves adapted to engage the valve seats to form an air-tight closure between the bearing and the spindle, and a spring means between the adjacent ends of the spindle parts to force the valves into engagement with the seats.

12. In a signal transmitting mechanism, a casing, a bearing in the casing, said bearing being in two parts, and forming a cavity, valve seats in the bearing and forming part of the cavity, a two-part spindle rotatably mounted in the bearing, the parts of the spindle being in axial alinement and spaced apart, enlargements on the adjacent ends of the spindle parts, said enlargements forming valves adapted to enter the valve seats to form air-tight closures between the bearing and the spindle, co-operating means between the parts of the spindle to cause the parts of the spindle to rotate in unison, and a spring means between the adjacent ends of the spindle parts to force the valves into engagement with the seats.

13. In a signal transmitting mechanism, a casing, a bearing in the casing, said bearing being in two parts, and forming a cavity, valve seats in the bearing and forming part of the cavity, a two part spindle rotatably mounted in the bearing, the parts of the spindle being in axial alinement and spaced apart, alining means associated with the parts of the spindle, enlargements on the spindle parts and within the cavity, said enlargements forming valves adapted to engage the valve seats to form an air-tight closure between the bearing and the spindle, co-operating means between the parts of the spindle to cause said parts to rotate in unison, spring means between the adjacent ends of the spindle parts to force the valve into engagement with the seats and means by which the spindle may be rotated.

Signed at New York in the county of New York and State of New York this 9th day of September A. D. 1920.

PAUL S. GRIERSON.